United States Patent
Ma et al.

(10) Patent No.: US 12,241,871 B1
(45) Date of Patent: Mar. 4, 2025

(54) METHOD FOR MEASURING THICKNESS, ROUGHNESS AND INTERFACE STIFFNESS OF COATING LAYER USING ULTRASONIC PHASE DERIVATIVE SPECTRUM

(71) Applicant: DALIAN UNIVERSITY OF TECHNOLOGY, Dalian (CN)

(72) Inventors: Zhiyuan Ma, Dalian (CN); Li Lin, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/800,210

(22) Filed: Aug. 12, 2024

Related U.S. Application Data

(63) Continuation of application No. PCT/CN2023/123112, filed on Oct. 6, 2023.

(30) Foreign Application Priority Data

Aug. 28, 2023 (CN) .......................... 202311103201.X

(51) Int. Cl.
*G01N 29/46* (2006.01)
*G01B 17/02* (2006.01)
(Continued)

(52) U.S. Cl.
CPC ........... *G01N 29/46* (2013.01); *G01B 17/025* (2013.01); *G01B 17/08* (2013.01); *G01N 29/04* (2013.01);
(Continued)

(58) Field of Classification Search
CPC ........ G01N 29/46; G01N 29/04; G01N 29/28; G01N 2291/0237; G01N 2291/02854; G01B 17/025; G01B 17/08
See application file for complete search history.

(56) References Cited

U.S. PATENT DOCUMENTS

| | | | | |
|---|---|---|---|---|
| 6,092,421 A | * | 7/2000 | Bar-Cohen | G01N 29/223 73/624 |
| 6,397,680 B1 | * | 6/2002 | Levesque | G01B 17/025 73/579 |
| 2020/0330069 A1 | * | 10/2020 | Ogura | A61B 8/4281 |

FOREIGN PATENT DOCUMENTS

| | | |
|---|---|---|
| CN | 103615996 A | 3/2014 |
| CN | 104197872 A | 12/2014 |
| CN | 108286952 A | 7/2018 |

OTHER PUBLICATIONS

Tianzhi Qi, Li Lin, Shuning Zhang, Zhiyuan Ma, Identification interface stiffness of coating/substrate structure based on ultrasonic pressure reflection coefficient amplitude spectrum, Applied Acoustics, vol. 201, 2022, 109094, ISSN 0003-682X (Year: 2022).*

* cited by examiner

Primary Examiner — Yoshihisa Ishizuka
(74) Attorney, Agent, or Firm — George D. Morgan

(57) ABSTRACT

The method for measuring thickness, roughness and interface stiffness of coating layer by using ultrasonic phase derivative spectrum which relates to technical field of the ultrasonic non-destructive testing. The method adopts an ultrasonic detection system which includes a sample of the coating layer, an ultrasonic flat probe, an ultrasonic flaw detector, a XYZ three-dimensional stepping device and a computer. The method derives UPDS (Ultrasonic phase derivative spectrum) when the ultrasonic wave is vertically incident on structure with three-medium and two-interface including coupled medium/coating layer/substrate, to conduct sensitivity analysis to identify the high sensitivity range of ultrasonic phase derivative spectrum to thickness, roughness and interface stiffness of coating layer, and to conduct correlation analysis to eliminate deviation introduced by initial phase of the reference signal and the detection signal, (Continued)

so as to achieve simultaneous quantitative characterization of thickness, roughness as well as interface stiffness of coating layer.

1 Claim, 7 Drawing Sheets

(51) Int. Cl.
    *G01B 17/08*     (2006.01)
    *G01N 29/04*     (2006.01)
    *G01N 29/28*     (2006.01)

(52) U.S. Cl.
    CPC ..... *G01N 29/28* (2013.01); *G01N 2291/0237* (2013.01); *G01N 2291/02854* (2013.01)

METHOD FOR MEASURING THICKNESS, ROUGHNESS AND INTERFACE STIFFNESS OF COATING LAYER USING ULTRASONIC PHASE DERIVATIVE SPECTRUM

CROSS-REFERENCE TO RELATED APPLICATIONS

The application claims priority to Chinese patent application No. 202311103201X, filed on Aug. 28, 2023, the entire contents of which are incorporated herein by reference.

TECHNICAL FIELD

The present invention discloses a method for measuring thickness, roughness and interface stiffness of coating layer by using ultrasonic phase derivative spectrum which relates to technical field of ultrasonic non-destructive testing.

BACKGROUND

Coating layer technology can significantly improve performance of key functional parts in terms of heat insulation, wear resistance, oxidation resistance and wave absorption. It has been widely used in aerospace, nuclear engineering, energy production and petrochemical engineering etc. Parameters like thickness, roughness and interface stiffness of coating layer are key indicators for characterizing surface and interface integrity of functional parts. The thickness and roughness of coating layer can significantly affect interfacial adhesion strength of the interface and ultimately codetermine quality and performance of parts of the coating layer. For example, the coating layer and metallic matrix interface change from compressive stress to tensile stress as thickness of the cold spray coating layer increases, and the interfacial adhesion strength first increases slightly and then decreases significantly. There is a certain roughness in the soft/soft, soft/hard or hard/hard interfaces of different material combinations which will increase the interfacial adhesion strength. However, factors like spraying process and oxidizing environment can change interface roughness as well. When the roughness increases to a certain extent, the stress concentration will occur, which weakens interfacial adhesion strength and even leads to peeling and failure of the coating layer. Therefore, it is of great significance to develop non-destructive characterization technology with multi-parameter for surface and interface integrity of functional parts such as thickness, roughness, as well as interface strength of the coating layer and then effectively control its quality so that the coating layer can exert its comprehensive performance in excellence.

Considering that coating layer usually has geometric features such as thin thickness as well as laminated structure and material coupling characteristics such as multiphase and non-uniformity, research on multi-parameter inversion of parts of the coating layer based on ultrasonic propagation model has attracted widespread attention. Parameter inversion technology has obvious advantages and flexibility in solving problems of complicated functions and unknown multiple characteristic parameters. For example, Dou et al. use the least squares method of the ultrasonic reflection coefficient spectrum and to simultaneously characterize thickness and sound velocity of YSZ (Yttria-stabilized zirconia) coating layer with porosity of <9% and with relative errors of 9.1% and 13.3%, respectively. Transmission coefficient model based on structure of the coating layer such as Bustillo et al. uses genetic algorithms to simultaneously invert sound velocity and density of the porous silicon thin layer with inversion errors of 0.04% and 0.8% respectively. Transmission coefficient amplitude function model based on multilayer structure such as Messineo et al. uses the least squares method to invert acoustic impedance, transit time, sound speed, density and attenuation coefficient of multilayer structure simultaneously in frequency domain. URCAS (Ultrasonic reflection coefficient amplitude spectrum) of the inhomogeneous multilayer coating structure constructed by Ma et al, and they use the least-squares coupled cross-correlation algorithm to simultaneously characterize 9 parameters of double-layer composite absorbing coating including the thickness, sound velocity, density, attenuation coefficient amplitude and power law etc. with maximum measurement error of 6.1%.

The above-mentioned inverse problems of ultrasonic testing of coating layer are based on assumption without exception that interface of structure of coating layer is smooth and perfectly bonded, and then the reflection or transmission coefficient model is constructed for the ultrasonic testing inversion. However, in order to improve bonded strength of membrane base of the coating layer, not only thickness of the coating layer must be accurately controlled, but also the interface must be usually prefabricated with appropriate roughness. The corrosion and oxidation behaviors during the service process can cause pores and microcracks on the interface, change the interface profile and weaken bonding quality so that imperfect interface with roughly and weakly bonding can be formed. Therefore, it is of significance to develop an integrated ultrasonic characterization method or technology for characterizing thickness, roughness, and interface bonding strength of the coating layer. For example, spring model based on weakly bonded interfaces under the acoustic wave effect such as Baltazar et al. proposed a method to extract resonant frequency of amplitude spectrum of ultrasonic sound pressure reflection coefficient to characterize the interface stiffness. In their work, a 10 MHz broadband probe was selected to detect aluminum plate/aluminum thin layer/aluminum plate structure. Results show that with increase of the interface stiffness, resonant frequency shifts to the high frequency region, and experimental results are in good agreement with the theoretical. In the previous work of inventor, based on phase-screen approximation principle of acoustic wave scattering on rough interface, URCPS (Ultrasonic pressure reflected coefficient phase spectrum) function is established when ultrasonic wave is vertically incident on structure of rough coating layer on inner interface, and the roughness, sound velocity as well as thickness of inner interface of the coating layer are characterized simultaneously for the first time. In the subsequent work, URCAS (Ultrasonic pressure reflected coefficient amplitude spectrum) based on spring model is established to invert interface stiffness of the coating layer or substrate structure. Maximum relational error between the inverted interface stiffness value and the default value within high sensitivity range is less than 6%. The above-mentioned method of using URCPS or URCAS to characterize interface roughness or stiffness requires collection of reference signals in advance and subsequent normalization of detection signals. Amplitude fluctuation of reference signal and phase deformation can bring non-negligible deviations to detection results. Moreover, the above-mentioned method is only a separate measurement of thickness, roughness or interface stiffness of the coating layer.

SUMMARY

Purpose of the present invention is to propose a method for measuring thickness, roughness and interface stiffness of the coating layer using ultrasonic phase derivative spectrum. It not only solves the problem of aliasing of echo of upper surface of the coating layer and echo of the coating layer/matrix interface when a single probe of ultrasonic body wave is incident vertically but also overcomes limitation of traditional methods such as URCPS or URCAS etc. that require reference signals, eliminates interference caused by initial phase of the detection signal and thickness of the coupling medium and overcomes the problems that equipment such as ultrasonic microscopes is relatively expensive, complicated to operate, and not easy to apply in the engineering, and that the existing ultrasonic body wave technology can't achieve simultaneous characterization of coupling parameters of thickness, roughness or interface stiffness of coating layer. With greater economic and social benefits, it has a wider range of applications, is simple to apply in engineering and can be extended to C-scan imaging for diagnosis of interface quality of coating layer.

Technical solution adopted by present invention to solve its technical problems is a method for measuring thickness, roughness and interface stiffness of the coating layer by using ultrasonic phase derivative spectrum. Ultrasonic detection system adopted includes a sample of coating layer, an ultrasonic flat probe, an ultrasonic flaw detector, a XYZ three-dimensional stepping device and a computer. The method comprises the following detection steps:

(1) Based on the boundary conditions of the continuous ($\sigma_1 = \sigma_2$) interface stress $\sigma$ and the discontinuous ($u_1 - u_2 = K_n \sigma$) displacement u, spring model of the rough and weakly bonded interface based on phase-screen approximation is proposed, and reflection coefficient $r_{12}$ and transmission coefficient $t_{12}$ are constructed when ultrasonic wave is vertically incident:

$$r_{12} = \frac{Z_2 - Z_1 + i(2\pi f / K_n) Z_2 Z_1}{Z_2 + Z_1 - i(2\pi f / K_n) Z_2 Z_1} \exp\left[\frac{-8\pi^2 q^2 f^2}{V_1^2}\right] \quad (1)$$

$$t_{12} = \frac{2 Z_2}{Z_2 + Z_1 - i(2\pi f / K_n) Z_2 Z_1} \exp\left[\frac{-V_2^2 V_1^2}{8\pi^2 Rq^2 f^2 (V_2 - V_1)^2}\right] \quad (2)$$

Wherein, $Z_1$ and $Z_2$ respectively represent the acoustic impedance of the medium 1 and medium 2 adjacent to the interface, $V_1$ and $V_2$ respectively represent the sound velocity of the medium 1 and medium 2 adjacent to the interface, i represents the imaginary part of the complex number, $K_n$ is the stiffness coefficient of vertical interface, Rq is the root mean square deviation of the interface contour, and f represents the ultrasonic frequency;

(2) The reflection echo $P_R$ when ultrasonic wave is vertically incident on the structure with three-medium and two-interface consisting of coupling medium/coating layer/substrate is obtained based on reflection coefficient $r_{12}$ and transmission coefficient $t_{12}$ of the rough and weakly bonded interface:

$$P_R = \frac{r_{wc} + r_{cw} \exp(2 i k_c d_c)}{1 + r_{cs} r_{cw} \exp(2 i k_c d_c)} \exp(i(2 k_w z_0 + \varphi_0)) \quad (3)$$

Wherein, $\varphi_0$ is initial phase, $z_0$ is distance between probe and coupling medium/interface of the coating layer, $k_w$ is the wave number in the coupling medium along the acoustic wave incident direction, $d_c$ represents thickness of the coating layer, $k_c$ represents the wave number of the coating layer, $r_{wc}$ and $r_{cs}$ respectively represent reflection coefficients of coupling medium/interface of the coating layer and coating layer/matrix interface, and i represents imaginary part of the complex number;

(3) Perform Fourier transform on the reflection echo $P_R$ to obtain the real part $Re(P_R)$ and imaginary part $Im(P_R)$ in the frequency domain f, and then derive the phase spectrum of reflection echo (RPS) on structure with three-medium and two-interface, where Vw represents longitudinal wave velocity of coupling medium and Vc represents the longitudinal wave velocity of the coating-layer;

$$RPS(f) = \arctan\left(\frac{Im(P_R)}{Re(P_R)}\right) = \\ \arctan\left(\frac{(1 - r_{wc}^2) r_{cs} \sin(4\pi f d_c / V_c)}{r_{wc} + (1 + r_{wc}^2) r_{cs} \cos(4\pi f d_c / V_c) + r_{wc} r_{cs}^2}\right) + \frac{2\pi f z_0}{V_w} + \varphi_0 \quad (4)$$

Wherein:

$$URCPS(f) = \arctan\left(\frac{(1 - r_{wc}^2) r_{cs} \sin(4\pi f d_c / V_c)}{r_{wc} + (1 + r_{wc}^2) r_{cs} \cos(4\pi f d_c / V_c) + r_{wc} r_{cs}^2}\right) \quad (5)$$

(4) Calculate the first-order derivative of the RPS obtained in step (3) with respect to the frequency variable f, and then obtain the ultrasonic phase derivative spectrum UPDS;

$$UPDS(f) = \frac{dRPS(f)}{df} = \frac{dURCPS(f)}{df} + \frac{2\pi z_0}{V_w} \quad (6)$$

(5) The sensitivity S of UPDS to parameter p to be tested is analyzed by using the sensitivity formula (7), where p represents the three parameters which are thickness $d_c$, roughness Rq and interface stiffness $K_n$ of the coating layer. The high sensitivity ranges $[d_{c-down} \sim d_{c-up}]$, $[Rq_{down} \sim Rq_{up}]$ and $[K_{n-down} \sim K_{n-up}]$ of thickness $d_c$, roughness Rq and interface stiffness $K_n$ of the coating layer are determined based on 10% of the sensitivity extreme value $S_{extr}$:

$$S_{UPDS,p} = p \frac{\partial UPDS}{\partial p} \quad (7)$$

(6) By using an ultrasonic detection system combined with ultrasonic transit time method and Archimedean drainage method, acoustic velocities $V_w$, $V_c$, $V_s$ and densities $\rho_w$, $\rho_c$, $\rho_s$ of the coupling medium, coating layer and substrate are obtained respectively;

(7) Place the ultrasonic flat probe above the coating sample to be tested, and the ultrasonic wave is incident on coupling medium/coating layer of and coating layer/matrix interface through coupling medium, and reflection echo $P_R(t)$ including coupling medium/coating layer and coating layer/matrix interface is collected;

(8) Perform Fourier transform on the reflection echo $P_R(t)$ collected in step (7) to obtain the experimental ultrasonic phase derivative spectrum $UPDS_{exp}(f)$ at the corresponding position of the sample of the coating layer;

(9) Use the cross-correlation formula (8) to invert the thickness $d_c$, roughness Rq and interface stiffness $K_n$ of the coating layer. In the high sensitivity ranges $[d_{c-down} \sim d_{c-up}]$, $[Rq_{down} \sim Rq_{up}]$ and $[K_{n-down} \sim K_{n-up}]$, the thickness $d_c$, roughness Rq and interface stiffness $K_n$ of the coating layer are respectively given continuously changing values to obtain the theoretical ultrasonic phase derivative spectrum $UPDS_{cal}(f)$, and calculate the cross-correlation of the experimental ultrasonic phase derivative spectrum $UPDS_{exp}(f)$ and the theoretical ultrasonic phase derivative spectrum $UPDS_{cal}(f)$ one by one; the $d_c$, Rq and $K_n$ corresponding to the maximum correlation coefficient position $\eta_{max}(d_c, Rq, K_n)$ are the optimal thickness, roughness and interface stiffness results of the sample of the coating layer:

$$\eta(d_c, Rq, K_n) = \left\| \frac{\sum_{j=1}^{N} \left[|UPDS_{cal}(f; d_c, Rq, K_n)| - \overline{|UPDS_{cal}(f; d_c, Rq, K_n)|}\right] \times \left[|UPDS_{exp}(f; d_c, Rq, K_n)| - \overline{|UPDS_{exp}(f; d_c, Rq, K_n)|}\right]}{\sqrt{\sum_{j=1}^{N} \left[|UPDS_{cal}(f; d_c, Rq, K_n)| - \overline{|UPDS_{cal}(f; d_c, Rq, K_n)|}\right]^2 \times \left[|UPDS_{exp}(f; d_c, Rq, K_n)| - \overline{|UPDS_{exp}(f; d_c, Rq, K_n)|}\right]^2}} \right\| \quad (8)$$

Wherein, N represents number of data points within −6 dB effective frequency band after Fourier transform of reflection echo $P_R(t)$, and j in formula (8) represents jth data point.

Specifically, in the high sensitivity range $[d_{c\text{-}down}\sim d_{c\text{-}up}]$, $[Rq_{down}\sim Rq_{up}]$ and $[K_{n\text{-}down}\sim K_{n\text{-}up}]$, continuous variation value of thickness $d_c$, roughness Rq and interface stiffness $K_n$ of the coating layer should be given at thin intervals as possible. For example, continuous variation value of thickness $d_c$, roughness Rq and interface stiffness $K_n$ of coating layer is given at one thousandth intervals.

Specifically, the coupling medium in the present invention is not particularly limited so that any common coupling medium such as water, glycerin, oil and organic glass etc. can be used.

Effects and benefits of the present invention are that the method for measuring thickness, roughness and interface stiffness of the coating layer by using ultrasonic phase derivative spectrum proposed in the present invention is the first to create spring model of roughly and weakly bonded interfaces under the acoustic wave effect based on phase-screen approximation, and then to derive UPDS (Ultrasonic phase derivative spectrum) function when ultrasonic wave is vertically incident on structure with three-layer and with two-interface including roughly as well as weakly coupled medium/coating layer/substrate, and to conduct sensitivity analysis to identify the high sensitivity interval of UPDS to thickness, roughness and interface stiffness of coating layer, and to conduct correlation analysis to eliminate deviation introduced by initial phase of the reference signal and the detection signal, so as to achieve the simultaneous quantitative characterization of thickness, roughness and interface stiffness of the coating layer. The present invention only requires a single ultrasonic body wave measurement to derive UPDS of aliased signal which overcomes limitation of traditional methods such as URCPS or URCAS etc. that require reference signals and eliminates interference caused by initial phase of the detection signal and thickness of the coupling medium so that the micrometer-level thickness, roughness or interface stiffness of the coating layer can be simultaneously measured. It also overcomes problems that equipment like ultrasonic microscopes is relatively expensive, complicated to operate, and difficult to apply in the engineering, and that the existing ultrasonic body wave technology cannot achieve the simultaneous characterization of the coupling parameters of thickness, roughness or interface stiffness of coating layer. With greater economic and social benefits, it has a wider range of applications, is simple to apply in engineering and can be extended to C-scan imaging for diagnosis of interface quality of coating layer.

BRIEF DESCRIPTION OF DRAWINGS

In FIG. 1: 1. sample; 2. ultrasonic flat probe; 3. XYZ three-dimensional stepping device; 4. ultrasonic flaw detector; 5. computer.

DETAILED DESCRIPTION OF THE EMBODIMENTS

Figure 1:
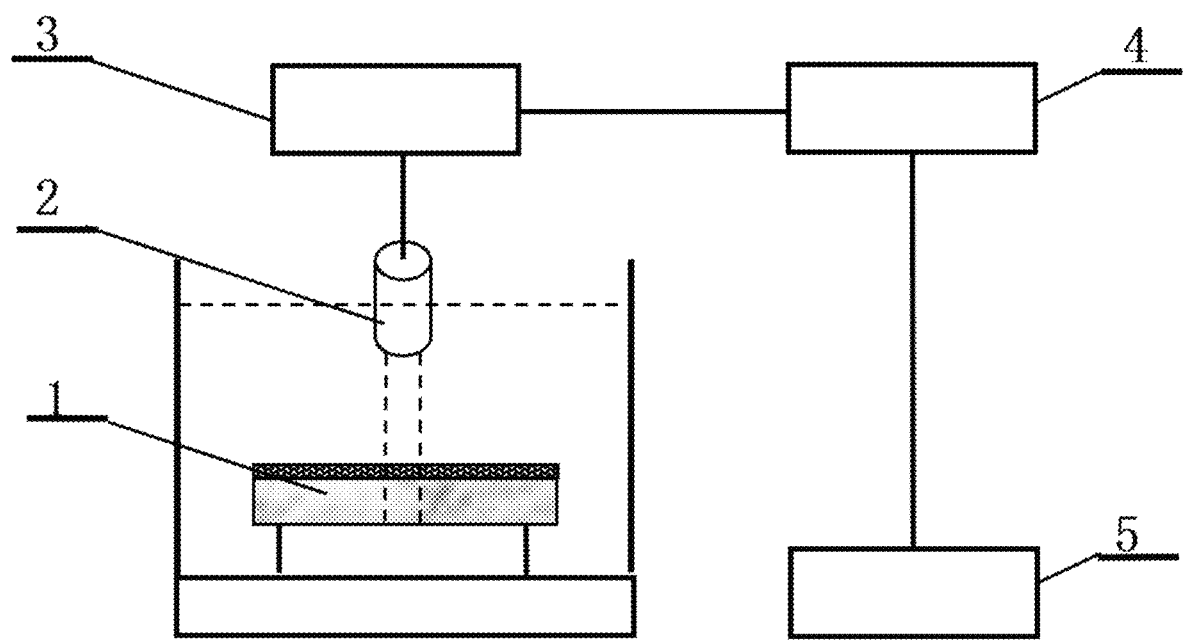
FIG. 1 is a connection diagram of ultrasonic detection system.
Figure 2:
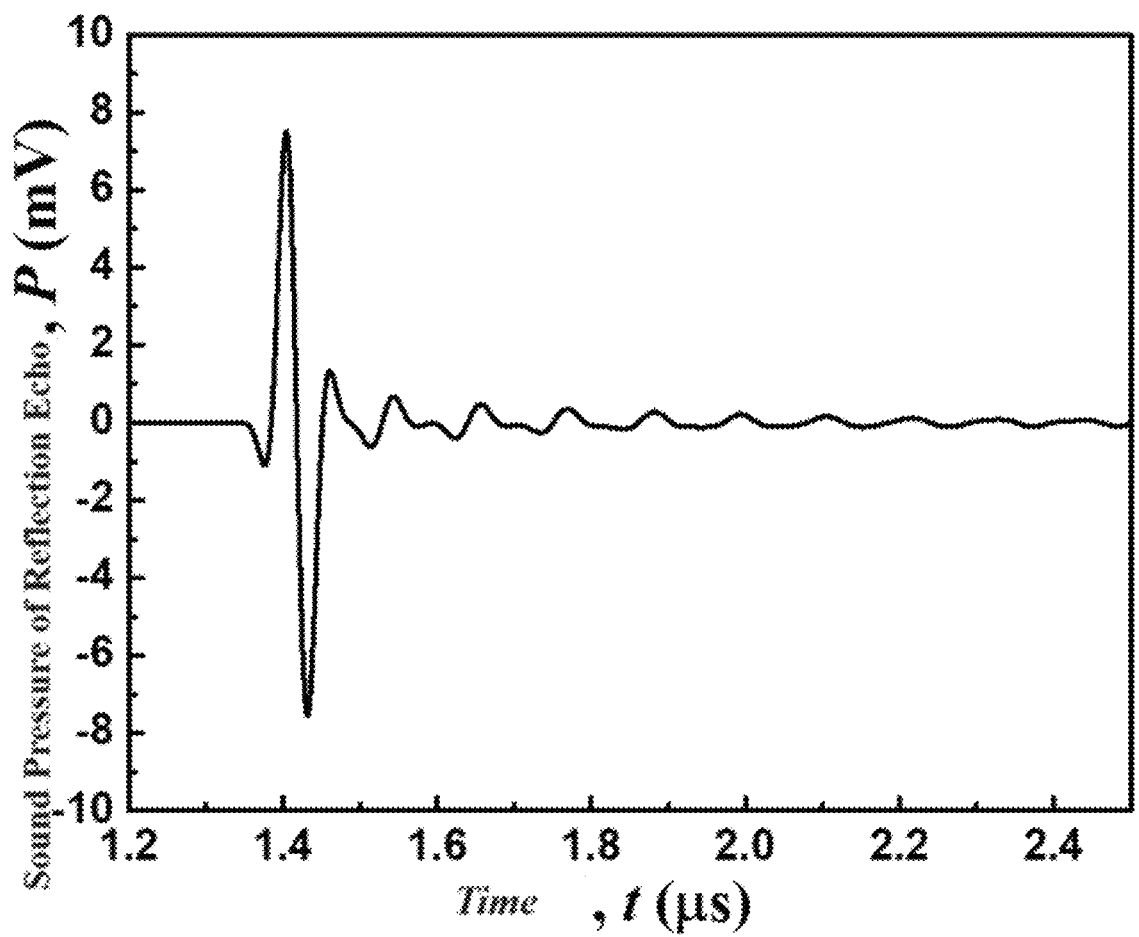
FIG. 2 shows a reflection echo $P_R(t)$ of sample of Ni coating layer or epoxy resin substrate.
Figure 3:
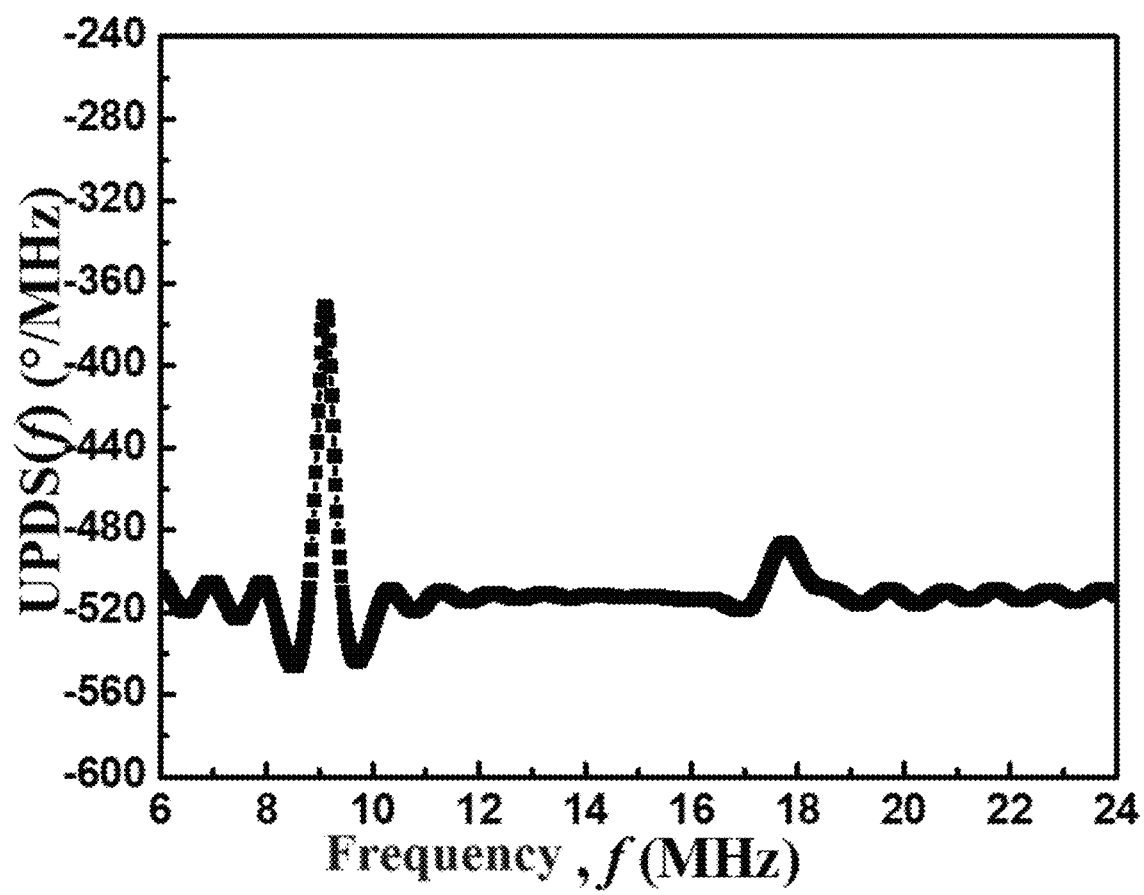
FIG. 3 shows $UPDS_{exp}(f)$ of sample of Ni coating layer or epoxy resin substrate.
Figure 4:
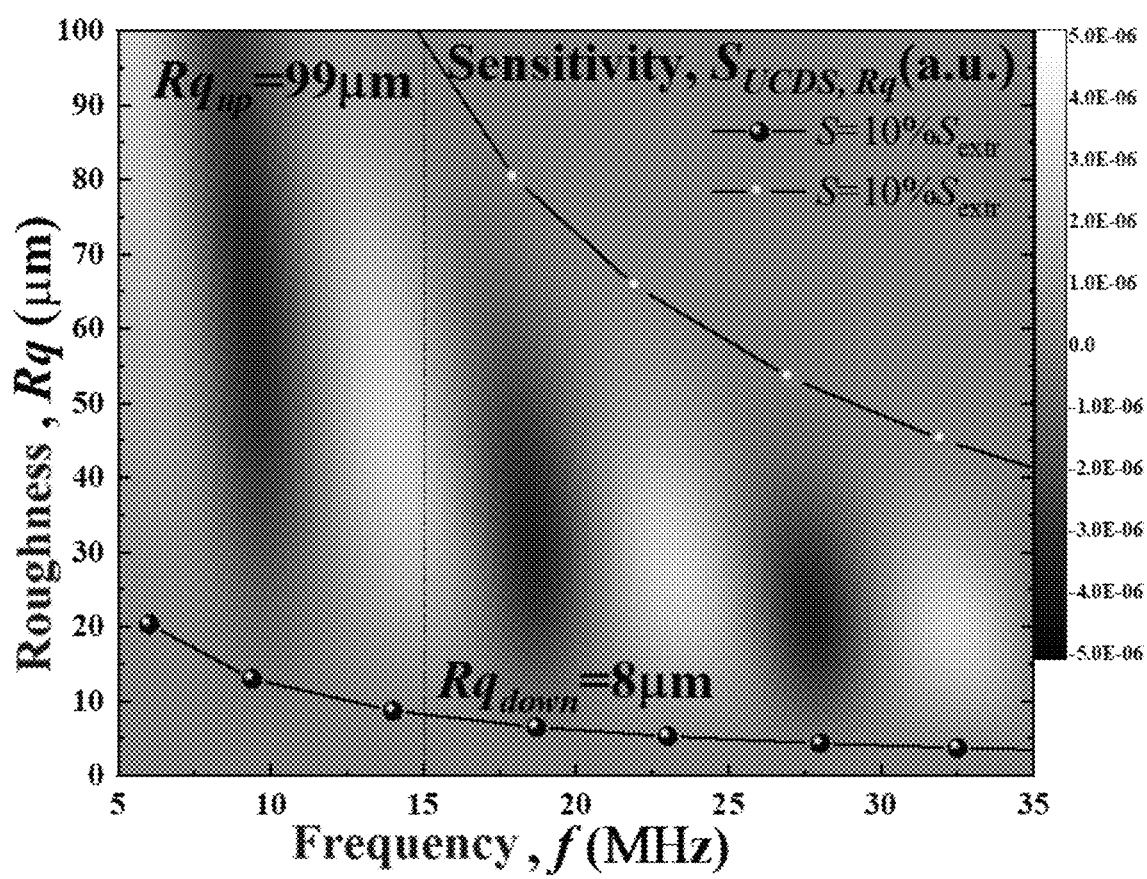
FIG. 4 shows sensitivity $S_{UPDS, Rq}$ of UPDS(f) to the roughness Rq.
Figure 5:
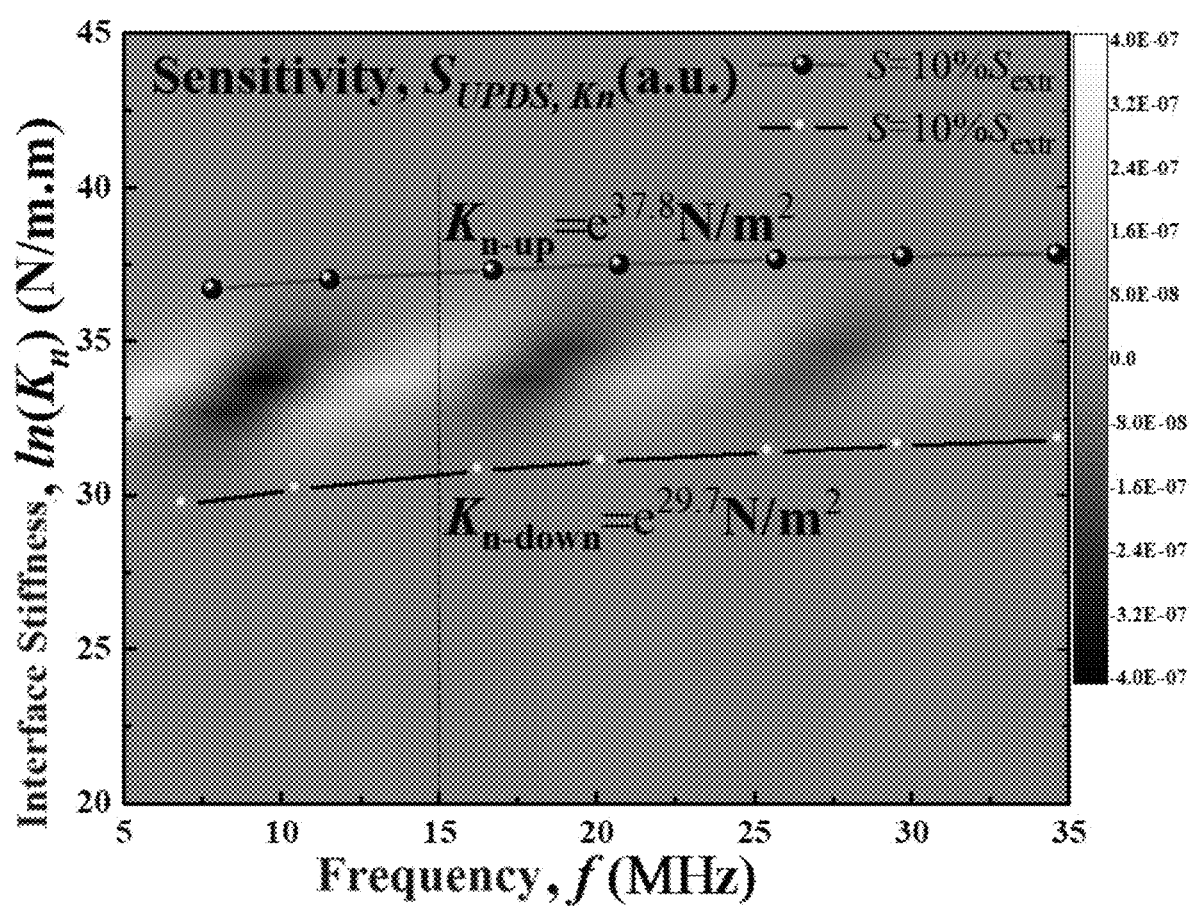
FIG. 5 shows sensitivity $S_{UPDS, Kn}$ of UPDS(f) to the interface stiffness $K_n$.
Figure 6:
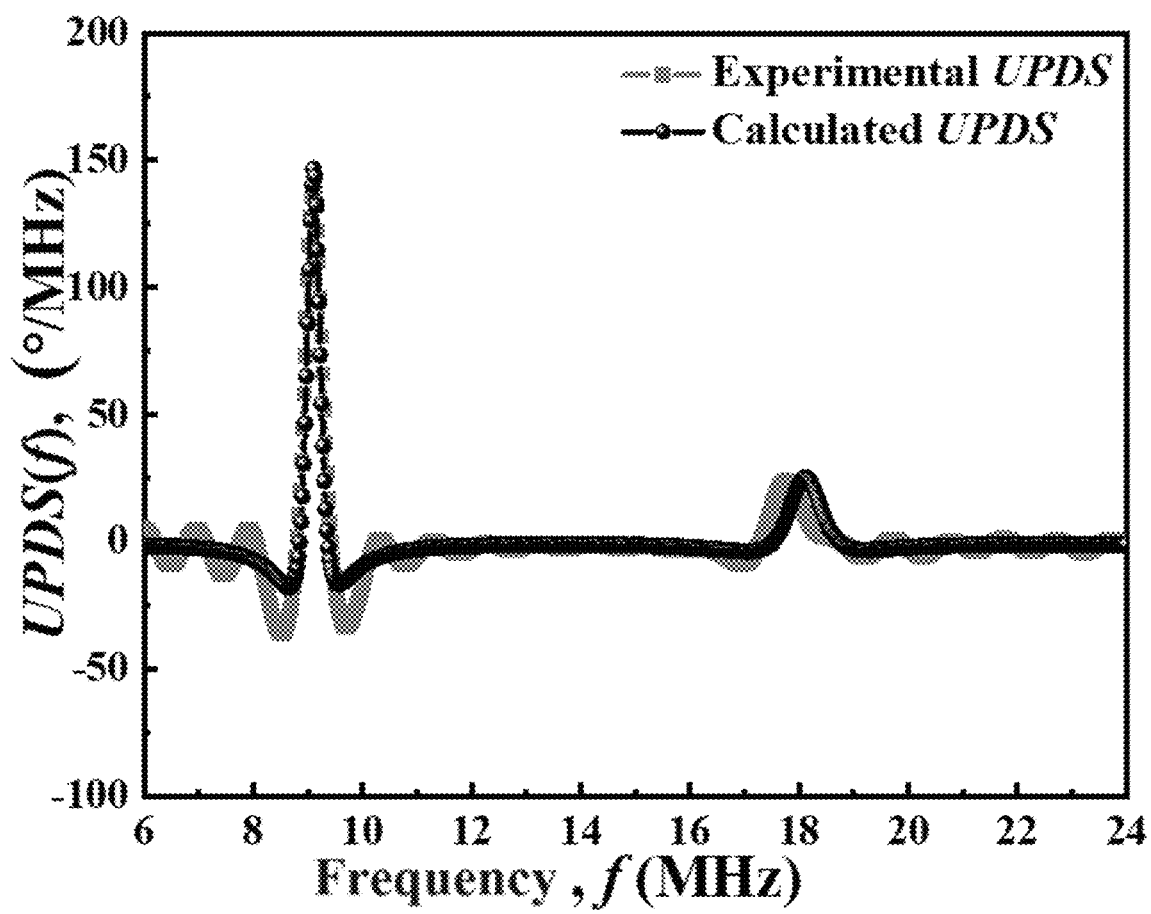
FIG. 6 is a comparison diagram of UPDS(f) obtained by experiment as well as inversion calculation.
Figure 7:
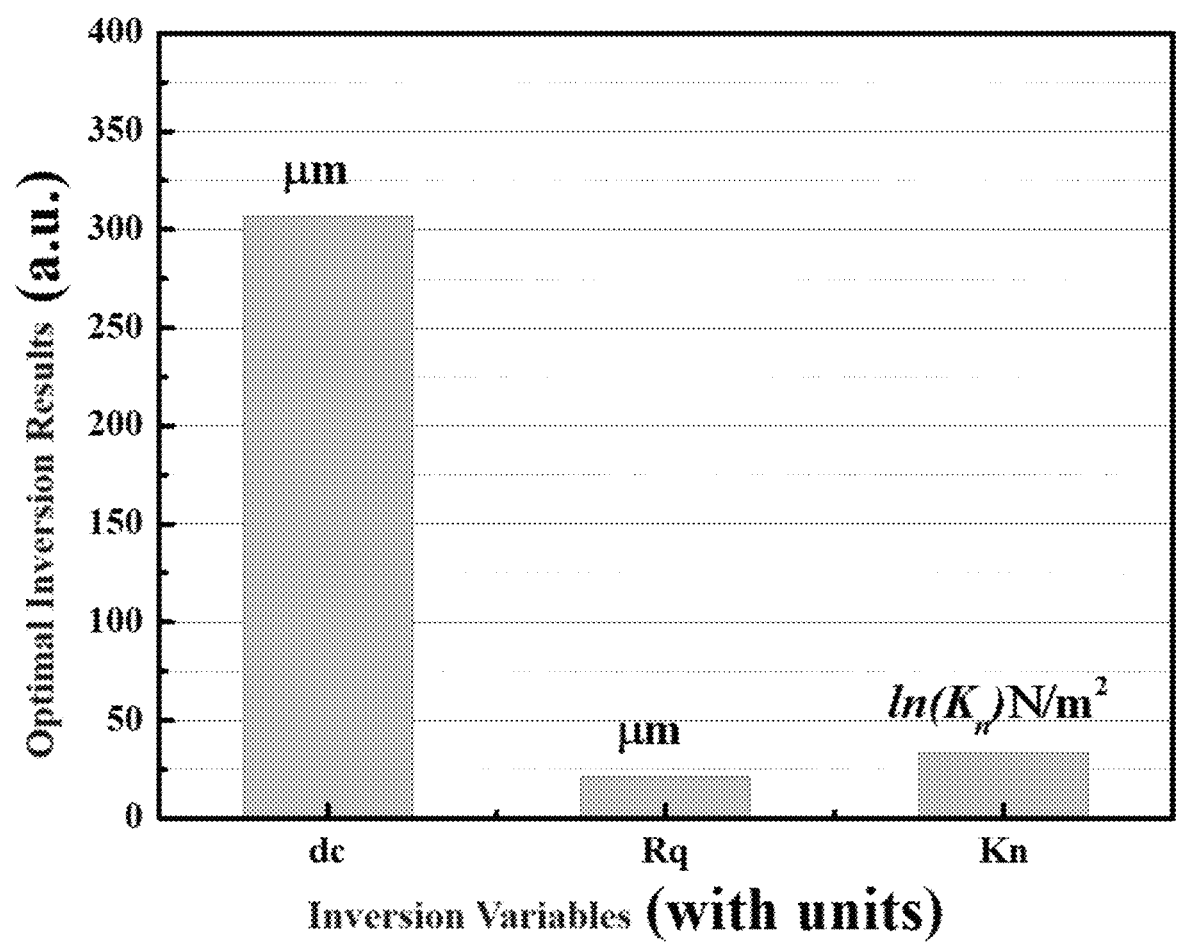
FIG. 7 is a diagram showing the inversion results of the thickness $d_c$, roughness Rq and interface stiffness $K_n$ of sample of Ni coating layer or epoxy resin substrate.

Ultrasonic detection system adopted in the embodiment includes a sample 1, an ultrasonic flat probe 2, a XYZ three-dimensional stepping device 3, an ultrasonic flaw detector 4 and a computer 5. Sample 1 is placed in water medium, while ultrasonic flat probe 2 is arranged above the sample 1 and moves its position via XYZ three-dimensional stepping device 3. Computer 5 is connected to ultrasonic flat probe 2 via ultrasonic flaw detector 4, and its specific connection way is shown in FIG. 1. The sample 1 adopts Ni coating layer or epoxy resin substrate, and the ultrasonic flat probe 2 adopts ultrasonic flat probe with nominal frequency of 15.0 MHz. Measurement steps used in method of measuring thickness, roughness and interface stiffness of coating layer using ultrasonic phase derivative spectrum are as follows:

(1) Use ultrasonic detection system in combination with ultrasonic transit time method and Archimedean drainage method to obtain sound velocities of coupling medium, coating layer as well as substrate which are respectively obtained to be $V_w=1480$ m/s, $V_c=5550$ m/s as well as $V_s=2679$ m/s and densities which are respectively obtained to be $\rho_w=1000$ kg/m$^3$, $\rho_c=8908$ kg/m$^3$ as well as $\rho_s=1210$ kg/m$^3$;

(2) Place ultrasonic flat probe above sample of coating layer to be tested, ensure that the main beam axis of the probe is perpendicular to the sample surface and ultrasonic wave is incident on water/coating layer as well as coating layer/matrix interface through coupling medium such as water, and collect reflection echo $P_R(t)$ including water/coating layer and coating layer/matrix interface, as shown in FIG. 2;

(3) Perform Fourier transform on collected reflection echo $P_R(t)$ to obtain experimental $UPDS_{exp}(f)$ at corresponding position of sample of the coating layer, as shown in FIG. 3;

(4) Analyze sensitivity S of the UPDS to the parameter p to be tested (p represents the 3 parameters including thickness $d_c$, roughness Rq and interface stiffness $K_n$ of the coating layer), as shown in FIGS. 4 and 5 and determine the high sensitivity range of thickness dc, roughness Rq and interface stiffness Kn of the coating layer which are respectively determined to be [0 µm~1000 µm], [8 µm~99 µm] and $[e^{29.7} \text{ N/m}^2 \text{ } e^{37.8} \text{ N/m}^2]$ according to 10% of the sensitivity extreme value $S_{extr}$;

(5) Use the cross-correlation formula to invert thickness dc, roughness Rq and interface stiffness $K_n$ of coating layer within the high sensitivity range of [0 µm~1000 µm], [8 µm~99 µm] and $[e^{29.7} \text{ N/m}^2 \text{~} e^{37.8} \text{ N/m}^2]$ in which a series of the continuous variation value of thickness dc, roughness Rq and interface stiffness $K_n$ of the coating layer is given at one thousandth intervals, thereby theoretical $\text{UPDS}_{cal}(f)$ can be obtained (see the ball line in FIG. 6). Maximum correlation coefficient of the theoretical $\text{UPDS}_{cal}(f)$ is $\eta_{max}=0.958$, and its corresponding optimal inversion parameters were $d_c=308$ µm, Rq=21.5 µm and $K_n=e^{33.3}$ N/m² when it is cross-correlated as matrix with experimental $\text{UPDS}_{exp}(f)$ one by one, as shown in FIG. 7. Relational error between inversion results of the sample thickness and thickness observed by optical microscope 300 µm is 2.6%; the relational error between inversion results of interface roughness and CLSM measurement result Rq=19.7 m is −9.1%; inversion results of interface stiffness at different positions are positively correlated with interface bonding strength obtained by the tensile test at the corresponding position.

What is claimed is:

1. A method for non-destructively measuring thickness, roughness and interface stiffness of a coating layer using ultrasonic phase derivative spectrum in industries, performed by a ultrasonic detection system comprising an ultrasonic flat probe, a XYZ three-dimensional stepping device and a processor, wherein the ultrasonic flat probe is configured to measure ultrasonic wave on a coating sample and positioned on the XYZ three-dimensional stepping device, and the processor is configured for:

(1) establishing a spring model for a rough and weakly bonded interface based on phase-screen approximation with boundary conditions of continuous ($\sigma_1=\sigma_2$) interface stress $\sigma$ and discontinuous ($u_1-u_2=K_n\sigma$) displacement u, and calculating reflection coefficient $r_{12}$ and transmission coefficient $t_{12}$ when ultrasonic wave is vertically incident:

$$r_{12} = \frac{Z_2 - Z_1 + i(2\pi f / K_n)Z_2 Z_1}{Z_2 + Z_1 - i(2\pi f / K_n)Z_2 Z_1} \exp\left[\frac{-8\pi^2 q^2 f^2}{V_1^2}\right] \quad (1)$$

$$t_{12} = \frac{2Z_2}{Z_2 + Z_1 - i(2\pi f / K_n)Z_2 Z_1} \exp\left[\frac{-V_2^2 V_1^2}{8\pi^2 Rq^2 f^2 (V_2 - V_1)^2}\right] \quad (2)$$

wherein, $Z_1$ and $Z_2$ respectively represent acoustic impedance of medium 1 and medium 2 adjacent to the rough and weakly bonded interface, $V_1$ and $V_2$ respectively represent sound velocities in the medium 1 and medium 2 adjacent to the rough and weakly bonded interface, i represents imaginary part of a complex number, Kn is stiffness coefficient of a vertical interface, Rq is root mean square deviation of an interface contour, and f represents ultrasonic frequency;

(2) obtaining a reflection echo $P_R$ when ultrasonic wave is vertically incident on a three-medium and two-interface structure comprising coupling medium/the coating layer/a substrate based on the reflection coefficient $r_{12}$ and the transmission coefficient $t_{12}$ of the rough and weakly bonded interface:

$$P_R = \frac{r_{wc} + r_{cw}\exp(2ik_c d_c)}{1 + r_{cs}r_{cw}\exp(2ik_c d_c)} \exp(i(2k_w z_0 + \varphi_0)) \quad (3)$$

wherein, $\varphi_0$ is initial phase, $z_0$ is distance from a probe to an interface between the coupling medium and the coating layer, $k_w$ is a wave number in the coupling medium along an incident direction of acoustic wave, $d_c$ represents a thickness of the coating layer, $k_c$ represents wave number of the coating layer, $r_{wc}$ and $r_{cs}$ respectively represent reflection coefficients of the interface between the coupling medium and the coating layer and an interface between the coating layer and the substrate, and i represents imaginary part of the complex number;

(3) performing Fourier transform on the reflection echo $P_R$ to obtain real part $\text{Re}(P_R)$ and imaginary part $\text{Im}(P_R)$ in a frequency domain f, and then derive reflection echo phase spectrum (RPS) on the three-medium and two-interface structure, wherein Vw represents longitudinal wave velocity of the coupling medium and Vc represents longitudinal wave velocity of the coating layer;

$$RPS(f) = \arctan\left(\frac{\text{Im}(P_R)}{\text{Re}(P_R)}\right) = \arctan\left(\frac{(1 - r_{wc}^2)r_{cs}\sin(4\pi f d_c / V_c)}{r_{wc} + (1 + r_{wc}^2)r_{cs}\cos(4\pi f d_c / V_c) + r_{wc}r_{cs}^2}\right) + \frac{2\pi f z_0}{V_w} + \varphi_0 \quad (4)$$

Wherein:

$$URCPS(f) = \arctan\left(\frac{(1 - r_{wc}^2)r_{cs}\sin(4\pi f d_c / V_c)}{r_{wc} + (1 + r_{wc}^2)r_{cs}\cos(4\pi f d_c / V_c) + r_{wc}r_{cs}^2}\right) \quad (5)$$

(4) calculating first-order derivative of the RPS obtained in step (3) with respect to a frequency variable f, so as to obtain ultrasonic phase derivative spectrum (UPDS);

$$UPDS(f) = \frac{dRPS(f)}{df} = \frac{dURCPS(f)}{df} + \frac{2\pi z_0}{V_w} \quad (6)$$

(5) analyzing sensitivity S of the UPDS to a parameter p to be tested by using a sensitivity formula (7), where p represents three parameters which are thickness $d_c$, roughness Rq and interface stiffness $K_n$ of the coating layer; and determining high sensitivity ranges $[d_{c-down} \sim d_{c-up}]$, $[Rq_{down} \sim Rq_{up}]$ and $[K_{n-down} \sim K_{n-up}]$ of thickness $d_c$, roughness Rq and interface stiffness $K_n$ of the coating layer based on 10% of a sensitivity extreme value $S_{extr}$;

$$S_{UPDS,p} = p\frac{\partial UPDS}{\partial p} \quad (7)$$

(6) obtaining acoustic velocities $V_w$, $V_c$, $V_s$ and densities $\rho_w$, $\rho_c$, $\rho_s$ of the coupling medium, the coating layer and the substrate respectively, based on a ultrasonic transit time method and a Archimedean drainage method;

(7) collecting reflection echo $P_R(t)$ from the interface between the coupling medium and the coating layer and the interface between the coating layer and the substrate, wherein ultrasonic wave passes through the coupling medium and is incident to the interface between the coupling medium and the coating layer and the interface between the coating layer and the substrate;

(8) performing a Fourier transform on the reflection echo $P_R(t)$ collected in step (7) to obtain experimental ultrasonic phase derivative spectrum $UPDS_{exp}(f)$ at a corresponding position of the coating sample;

(9) inverting the thickness $d_c$, roughness Rq and interface stiffness $K_n$ of the coating layer by a cross-correlation formula (8); in high sensitivity ranges $[d_{c\text{-}down}\sim d_{c\text{-}up}]$, $[Rq_{down}\sim Rq_{up}]$ and $[K_{n\text{-}down}\sim K_{n\text{-}up}]$, assigning continuously varying values to the thickness $d_c$, roughness Rq and interface stiffness $K_n$ of the coating layer to obtain theoretical ultrasonic phase derivative spectrum $UPDS_{cal}(f)$, and performing cross-correlation operation between the experimental ultrasonic phase derivative spectrum $UPDS_{exp}(f)$ and the theoretical ultrasonic phase derivative spectrum $UPDS_{exp}(f)$ one by one, wherein values of $d_c$, Rq and $K_n$ corresponding to a position of $\eta_{max}$ ($d_c$, $R_q$, $K_n$) where correlation coefficient is highest are optimal results for thickness, roughness and interface stiffness of the coating sample:

$$\eta(d_c, Rq, K_n) = \qquad (8)$$

$$\left\| \frac{\sum_{j=1}^{N} \left[ |UPDS_{cal}(f; d_c, Rq, K_n)| - \overline{|UPDS_{cal}(f; d_c, Rq, K_n)|} \right] \times \left[ |UPDS_{exp}(f; d_c, Rq, K_n)| - \overline{|UPDS_{exp}(f; d_c, Rq, K_n)|} \right]}{\sqrt{\sum_{j=1}^{N} \left[ |UPDS_{cal}(f; d_c, Rq, K_n)| - \overline{|UPDS_{cal}(f; d_c, Rq, K_n)|} \right]^2 \times \left[ |UPDS_{exp}(f; d_c, Rq, K_n)| - \overline{|UPDS_{exp}(f; d_c, Rq, K_n)|} \right]^2}} \right\|$$

wherein N represents a number of data points within −6 dB effective frequency band after Fourier transform of reflection echo $P_R(t)$, and j in formula (8) represents a jth data point.

* * * * *